(No Model.)
P. MELTON.
ROOT OR SOD CUTTER.
No. 605,497. Patented June 14, 1898.
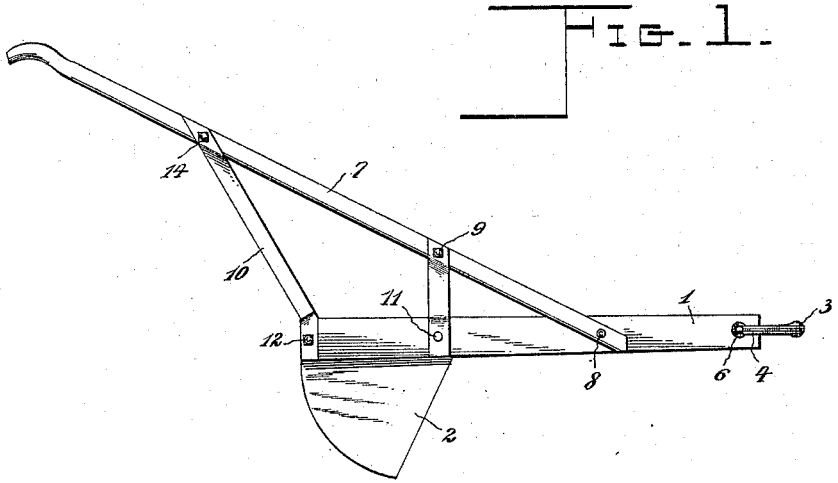
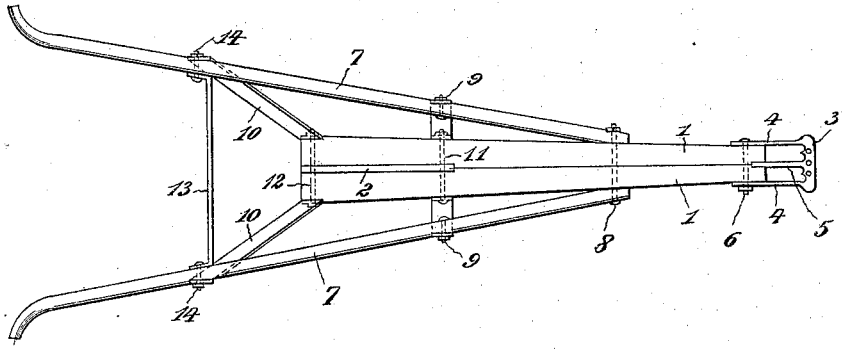
Witnesses
John F. Beuffuniel
U. B. Hillyard.
Inventor
Pink Melton.
By his Attorneys,
C A Snow & Co.

UNITED STATES PATENT OFFICE.

PINK MELTON, OF WINKLER, TEXAS.

ROOT OR SOD CUTTER.

SPECIFICATION forming part of Letters Patent No. 605,497, dated June 14, 1898.

Application filed November 17, 1897. Serial No. 658,837. (No model.)

*To all whom it may concern:*

Be it known that I, PINK MELTON, a citizen of the United States, residing at Winkler, in the county of Navarro and State of Texas, have invented a new and useful Root or Sod Cutter, of which the following is a specification.

This invention has for its object to provide an improved implement for cutting sod, roots, and the like, which will be of simple construction, of light draft, and effective for the purpose.

With these and like objects in view the invention consists of the novel features, details of construction, and combination of parts which hereinafter will be more particularly set forth, illustrated, and finally claimed.

In the drawings, Figure 1 is a side elevation of an implement specially designed for attaining the objects of this invention. Fig. 2 is a top plan view thereof.

Corresponding and like parts are referred to in the following description and indicated in both views of the drawings by the same reference characters.

The implement comprises complementary beams 1, placed side by side and bolted together. A cutter 2, consisting of an approximately triangular-shaped blade, is secured at its upper end between the rear ends of the beams 1, the latter being cut away on their opposing faces a distance to receive between them the blade, as clearly indicated in Fig. 2.

A clevis 3, comprising side bars 4 and a middle bar 5, is secured to the front end of the beams by a bolt 6, the latter passing through transversely-alining openings in the side bars 4 and front ends of the beams 1. The middle bar 5, extending parallel with the side bars 4, has its rear end fitted into a space formed between the front ends of the beams 1 by cutting away a portion of the latter on their inner or opposing sides. This middle bar 5 strengthens the clevis and prevents it turning upon the bolt 6. The front or horizontal bar of the clevis is formed with a series of openings for attachment therewith of the draft, whereby the pulling strain may be in direct line with the cutter-shoe or a little to one side or the other, as desired.

Handles 7 are fastened at their lower ends to the beams 1 by a bolt 8, the latter also serving to secure the parts 1, and these handles are strengthened by braces 9 and 10, the latter inclining upwardly, rearwardly, and outwardly from the rear ends of the beams and the braces 9 being located at an intermediate point and upwardly divergent. A bolt 11 secures the lower ends of the braces 9 to the beams and likewise passes through an opening in the cutter 2, thereby serving to connect these parts. A bolt 12, passing through the lower ends of the braces 10 and transversely-alining openings in the beams and cutter, secures these parts, thereby obviating the necessity of providing independent fastenings for the different parts. A cross-bar 13 holds the upper ends of the handles 7 apart and is fastened at its ends to the handles and the upper ends of the braces 10 by bolts 14. The handles may be of metal or wood, and the beams 1 may be of like material.

From the foregoing it will be readily understood that the implement is constructed with a view to simplicity, economy, and durability, the parts being of a minimum number and the fastenings of the fewest possible consistent with securing the component parts.

Having thus described the invention, what is claimed as new is—

1. The combination with complementary beams secured side by side and having portions of their opposing sides cut away at their front ends, forming a space, of a clevis comprising a front bar having a series of openings, a middle bar having its rear end entering the said space, and side bars embracing the sides of the beams, and a bolt passing through transversely-alining openings in the side bars of the clevis and front ends of the beams and connecting all together, substantially as set forth.

2. The herein-described sod-cutter, comprising complementary beams having portions removed from their opposing faces at their front and rear ends, forming spaces, a cutter having its upper end inserted in the rear space, handles, front and rear braces secured at their upper ends to the handles, bolts securing the lower ends of the handles and braces to the beams and holding the latter together, the bolts passing through the lower ends of the braces serving as securing means for the cutter, a clevis comprising a middle bar having its rear end fitted into the front space formed between the beams, and side bars embracing the sides of the beams, and a bolt passing through transversely-alining openings in the beams and side bars of the clevis, substantially as described.

In testimony that I claim the foregoing as my own I have hereto affixed my signature in the presence of two witnesses.

PINK MELTON.

Witnesses:
 TIM HOUSTON,
 B. M. CLOPTEN, Jr.